Jan. 23, 1934.     G. JOHNSON     1,944,513
EXPANSION RIVET
Filed Jan. 5, 1931

Inventor:
Gustav Johnson
by Emery, Booth, Varney & Townsend
Att'ys

Patented Jan. 23, 1934

1,944,513

UNITED STATES PATENT OFFICE 1,944,513

EXPANSION RIVET

Gustav Johnson, West Roxbury, Mass., assignor to United-Carr Fastener Corporation, Cambridge, Mass., a corporation of Massachusetts Application January 5, 1931. Serial No. 506,545

5 Claims. (Cl. 85—40)

My invention aims to provide improvements in expansion rivets for securing two or more apertured parts together.

In the drawing which illustrates a preferred embodiment of my invention:—

Figure 1:
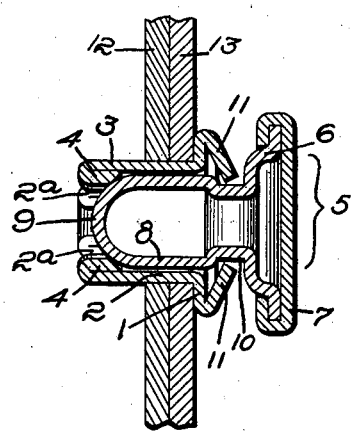
Figure 1 is a sectional view of a rivet installation embodying my improved rivet and showing the rivet before being expanded.

Referring to the particular embodiment of my invention illustrated by the drawing, I have shown a rivet unit particularly adapted for rigidly securing two or more parts together. The rivet unit illustrated is of the expansible shank type and is particularly useful when it is difficult or impossible to obtain access to one side of the parts and, therefore, making it necessary to apply and upset the rivet while being able to work at only one side of the parts to be secured together. A feature of my invention is the provision of a rivet unit comprising a rivet part and an expanding part secured together by means which, while holding the parts in assembled relation without interfering with the expanding of the rivet part, is adapted to permit separation of the expanding part from the rivet part. Thus, when the rivet is upset, as shown in Fig. 2, the parts secured together may be separated by removing the expanding part and thereafter the rivet part, as hereinafter described.

The rivet unit of my invention is formed in two sheet metal parts. The rivet part has a flange providing a head 1 from which extends a shank 2. The shank 2 is divided by a number of longitudinal slits 2ª to provide a series of yieldable fingers 3 having inturned portions 4 at their free ends surrounding an aperture at the free end of the shank 2, as shown in Figure 1. The expanding part has a head 5 provided by a flange 6 and a cap 7 and has also a shank 8 extending from the head 5 and provided with a rounded end 9. Normally the two parts of the unit are assembled prior to its use. Therefore, I have provided a neck 10 in the shank 8 and two bendable ears 11—11 extending from the head 1 of the rivet part toward each other and at an angle to the axis of the rivet part, as shown in Fig. 1. To assemble the parts the end 9 of the shank 8 is forced between the ends of the bendable ears 11—11 until they snap into the neck 10. The outer diameter of the shank 8 is slightly smaller than the inner diameter of the hollow shank 2 and, therefore, when the parts are assembled there is a certain amount of lost motion between them. This provides for manufacturing tolerances and also permits the shank 2 to contract slightly if driven into a slightly undersized hole through the parts it is to secure together.

Figure 2:
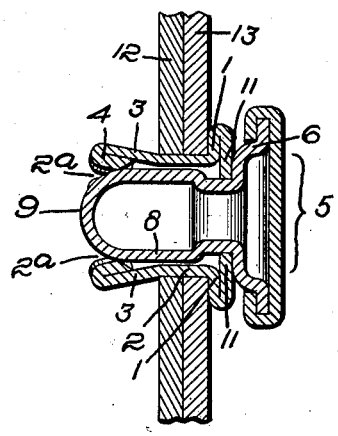
Fig. 2 is a section similar to Figure 1, but showing the rivet expanded to secure the sheet metal parts together.
Figure 3:
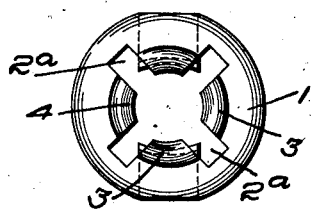
Figs. 3 and 4 show, respectively, opposite end views of the rivet part of the rivet unit.
Figure 4:
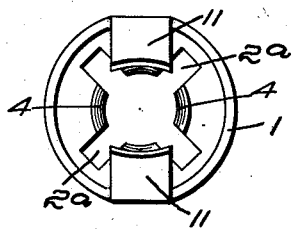
Figure 5:
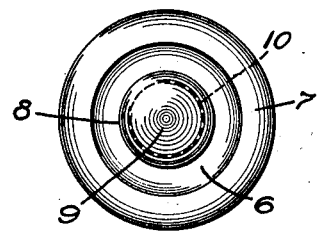
Fig. 5 is an end elevation of the expanding element as it would appear as viewed from the left-hand side of Figure 1.

In Figs. 1 and 2, I have shown my rivet unit used to secure two thin sheets 12 and 13 of metal together. In securing the metal sheets 12 and 13 together, the shank of the rivet part is first pushed through holes formed in the sheets, as shown in Fig. 1. To secure the rivet unit in place a suitable tool (not shown) is used to exert force against the head 5 of the expanding part, thereby moving the shank 8 of the expanding part relative to the shank 2 of the rivet part. When the expanding element is moved axially relative to the shank the rounded end portion 9 thereof wedges against the inturned portions 4 of the fingers 3 to expand that portion of the shank 2 which extends beyond the sheet 12, as clearly illustrated in Fig. 2. During the attaching or expanding operation the head 5 of the expanding part flattens the ears 11—11, as shown in Fig. 2, but when it is desirable to separate the two sheet metal parts it is only necessary to pull outwardly on the expanding part. The separation may be easily effected by inserting the blade of a screw driver, or the like, under the head 5 of the expanding part and using it as a pry thereby to pull that part outwardly and bend the ears 11—11 outwardly until the expanding part may be removed. Thereafter the rivet part may be readily removed, because the fingers are free to contract and pull through the aperture through the parts.

While I have illustrated and described a preferred embodiment of my invention, I do not wish to be limited thereby as the scope of my invention is best defined in the following claims.

1. A rivet comprising, in combination, a rivet part and an expanding part normally assembled prior to attachment of the rivet to the parts to be secured together, said rivet part having a head and an expansible shank, said expanding part having a shank extending into the expansible shank of said rivet, means provided by said expansible shank of said rivet for engagement by said shank of said expanding part thereby to expand said expansible shank, a neck provided in the shank of said expanding part and means extending from said rivet into said neck thereby holding the parts in assembled relation.

2. A rivet comprising, in combination, a rivet part and an expanding part normally assembled prior to attachment of the rivet to the parts to be secured together, said rivet part having a head and an expansible shank, said expanding part having a shank extending into the expansible shank of said rivet, means provided by said expansible shank of said rivet for engagement by said shank of said expanding part thereby to expand said expansible shank, a neck provided in the shank of said expanding part and bendable means extending from said rivet into said neck thereby holding the parts in assembled relation.

3. A rivet comprising, in combination, a rivet part and an expanding part normally assembled prior to attachment of the rivet to the parts to be secured together, said rivet part having a head and an expansible shank, said expanding part having a shank extending into the expansible shank of said rivet, means provided by said expansible shank of said rivet for engagement by said shank of said expanding part thereby to expand said expansible shank, a neck provided in the shank of said expanding part and a number of bendable ears extending from the head of said rivet into the said neck to secure said parts in assembled relation.

4. A rivet comprising, in combination, a rivet part and an expanding part normally assembled prior to attachment of the rivet to the parts to be secured together, said rivet part having a head and an expansible shank, said expanding part having a shank extending into the expansible shank of said rivet, means provided by said expansible shank of said rivet for engagement by said shank of said expanding part thereby to expand said expansible shank, a neck provided in the shank of said expanding part, bendable means extending from said rivet into said neck thereby holding the parts in assembled relation and means provided as a part of the expanding part and engageable with said bendable means to flatten said means and permit movement of said expanding part for expansion of the shank of said rivet.

5. A rivet comprising, in combination, a rivet part and an expanding part normally assembled prior to attachment of the rivet to the parts to be secured together, said rivet part having a head and an expansible shank, said expanding part having a shank extending into the expansible shank of said rivet, means provided by said expansible shank of said rivet for engagement by said shank of said expanding part thereby to expand said expansible shank, a neck provided in the shank of said expanding part, a number of bendable ears extending at an angle from the head of said rivet into the said neck to secure said parts in assembled relation and a head provided on said expanding part for flattening said ears when said expanding part is moved to expand the shank of the rivet part.

GUSTAV JOHNSON.